United States Patent [19]

Sakamura et al.

[11] Patent Number: 4,977,497
[45] Date of Patent: Dec. 11, 1990

[54] DATA PROCESSOR

[75] Inventors: Ken Sakamura, Tokyo; Toru Shimizu, Itami; Shunichi Iwata, Itami; Tatsuya Enomoto, Itami, all of Japan

[73] Assignee: Mitsubishi Denki Kabushiki Kaisha, Tokyo, Japan

[21] Appl. No.: 419,350

[22] Filed: Oct. 10, 1989

Related U.S. Application Data

[62] Division of Ser. No. 172,041, Mar. 23, 1988.

[51] Int. Cl.⁵ .............................................. G06F 1/00
[52] U.S. Cl. .................................. 364/200; 364/259; 364/259.8; 364/263
[58] Field of Search ... 364/200 MS File, 900 MS File, 364/754

[56] References Cited

U.S. PATENT DOCUMENTS

| 4,103,329 | 7/1978 | Davis et al. | 364/200 |
| 4,133,030 | 1/1979 | Huettner et al. | 364/200 |
| 4,261,033 | 4/1981 | Lemay et al. | 364/200 |
| 4,325,119 | 4/1982 | Grandmaison et al. | 364/200 |
| 4,407,016 | 9/1983 | Bayliss et al. | 364/200 |
| 4,484,259 | 11/1984 | Palmer et al. | 364/754 |

*Primary Examiner*—Raulfe B. Zache
*Attorney, Agent, or Firm*—Townsend and Townsend

[57] ABSTRACT

A data processor in accordance with the present invention can normally operate bit-string data while avoiding a breakage of the data even in the case where a read-out area of the bit string and a write-in area thereof are overlapped each other by providing an operation code of an instruction with an option designating the direction of bit processing.

3 Claims, 11 Drawing Sheets

Fig. 3

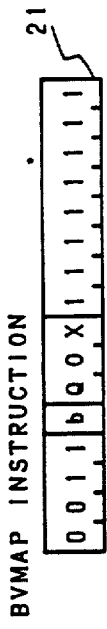

BVMAP INSTRUCTION

Fig. 4

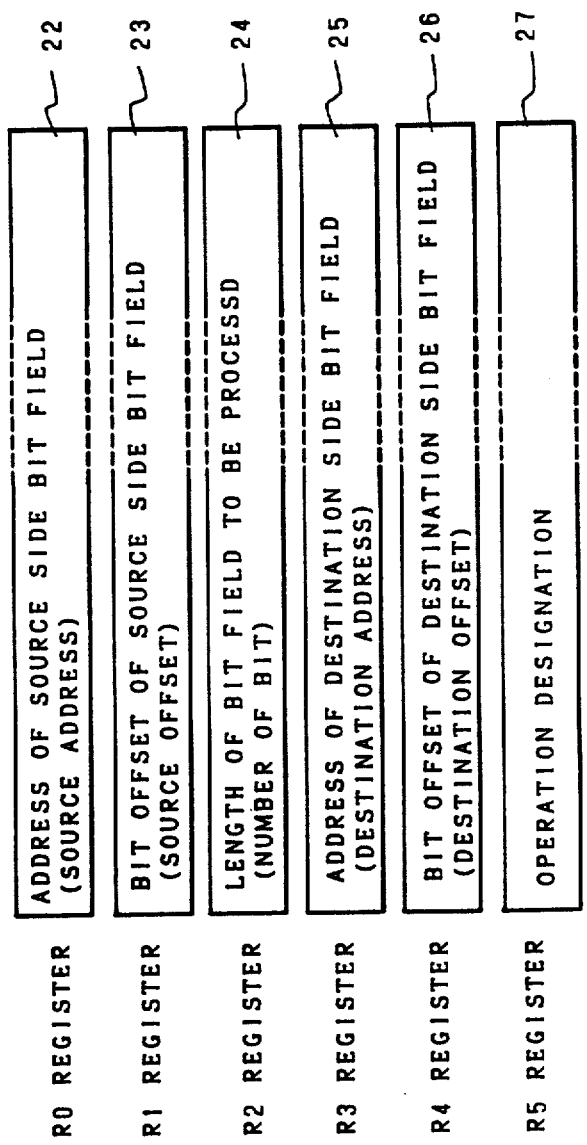

| | |
|---|---|
| R0 REGISTER | ADDRESS OF SOURCE SIDE BIT FIELD (SOURCE ADDRESS) |
| R1 REGISTER | BIT OFFSET OF SOURCE SIDE BIT FIELD (SOURCE OFFSET) |
| R2 REGISTER | LENGTH OF BIT FIELD TO BE PROCESSD (NUMBER OF BIT) |
| R3 REGISTER | ADDRESS OF DESTINATION SIDE BIT FIELD (DESTINATION ADDRESS) |
| R4 REGISTER | BIT OFFSET OF DESTINATION SIDE BIT FIELD (DESTINATION OFFSET) |
| R5 REGISTER | OPERATION DESIGNATION |

Fig. 8

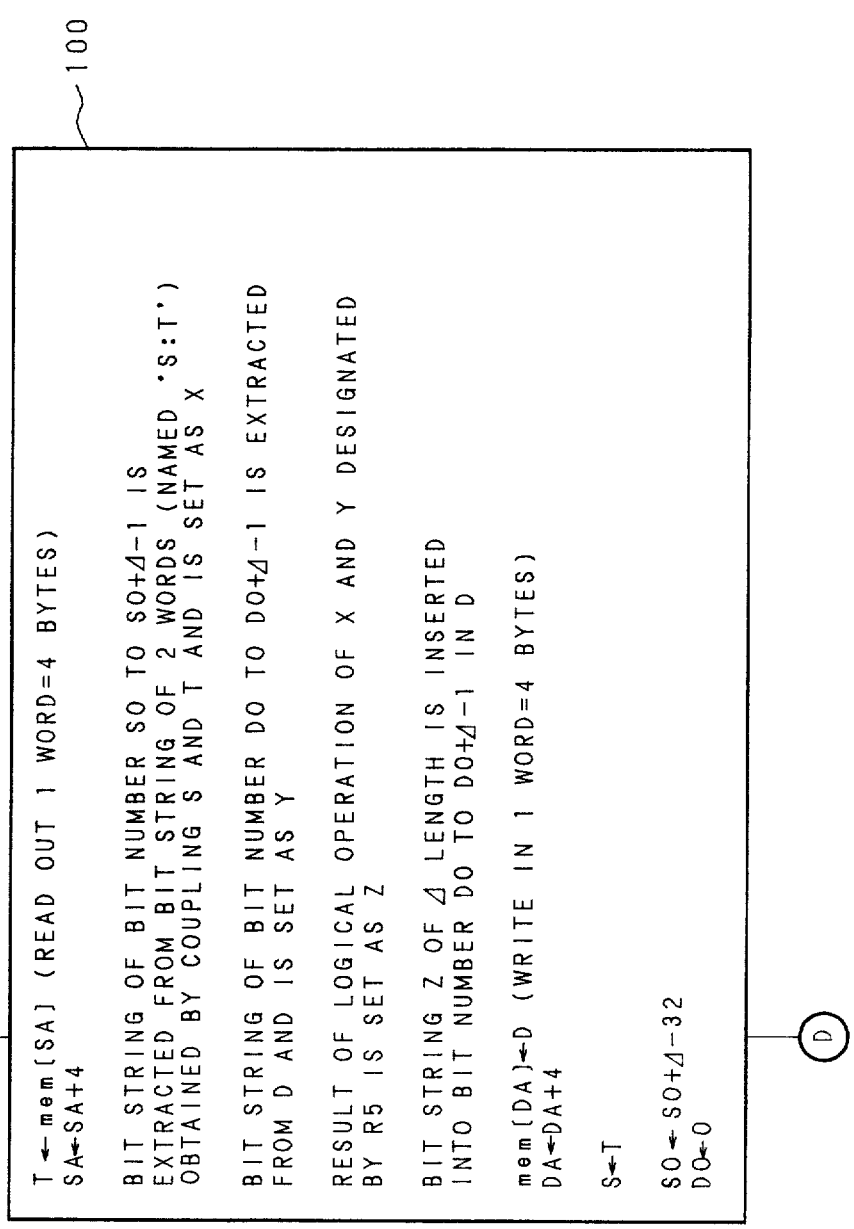

T ← mem[SA] (READ OUT 1 WORD=4 BYTES)
SA ← SA+4

BIT STRING OF BIT NUMBER S0 TO S0+$\Delta$-1 IS
EXTRACTED FROM BIT STRING OF 2 WORDS (NAMED 'S:T')
OBTAINED BY COUPLING S AND T AND IS SET AS X BIT STRING OF BIT NUMBER D0 TO D0+$\Delta$-1 IS EXTRACTED
FROM D AND IS SET AS Y

RESULT OF LOGICAL OPERATION OF X AND Y DESIGNATED
BY R5 IS SET AS Z

BIT STRING Z OF $\Delta$ LENGTH IS INSERTED
INTO BIT NUMBER D0 TO D0+$\Delta$-1 IN D mem[DA] ← D (WRITE IN 1 WORD=4 BYTES)
DA ← DA+4

S ← T

S0 ← S0+$\Delta$-32
D0 ← 0

T ← mem[SA] (READ OUT 1 WORD=4 BYTES)
SA ← SA−4

BIT STRING OF BIT NUMBER SO−△+32 TO 32+SO−1 IS
EXTRACTED FROM BIT STRING OF 2 WORDS (NAMED 'T:S')
OBTAINED BY COUPLING T AND S AND IS SET AS X

BIT STRING OF BIT NUMBER DO−△ TO DO−1 IS EXTRACTED
FROM D AND IS SET AS Y

RESULT OF LOGICAL OPERATION OF X AND Y DESIGNATED
BY R5 IS SET AS Z

BIT STRING Z OF △ LENGTH IS INSERTED
INTO BIT NUMBER DO−△ TO DO−1 IN D mem[DA] ← D (WRITE IN 1 WORD=4 BYTES)
DA ← DA−4

S ← T

SO ← SO−△+32
DO ← 32

(d)

DATA PROCESSOR

This is a division of application Ser. No. 07/172,041 filed Mar. 23, 1988 now abandoned.

BACKGROUND OF THE INVENTION

1. Field of the Invention

The present invention relates to a data processor which is constituted a manner capable of operating a bit field having an arbitrary length.

2. Description of the Prior Art

The conventional data processors such as microprocessors realize operation of a bit field having an arbitrary length by repeating execution of an instruction of performing operation on a bit field of a fixed length, or in the case of not having such instruction, by combining an instruction of performing operation on a byte basis with an instruction of performing operation on a bit basis.

In the conventional data processors, in the case where a read-out area of a bit string and a write-in area thereof are overlapped each other for instructions of performing read-out and write-in of the bit string, for example an instruction for moving bit-string data in a memory, bit data read in the second half might be broken in writing the bit data in the first half.

Also, in the conventional data processors, a problem exists that in the case where the length of the bit string is arbitrary, the execution time of an instruction of operating the bit string becomes long in proportion to the length of the bit string, resulting in a break of reception of external interrupt up to the end of execution of the instruction.

SUMMARY OF THE INVENTION

The present invention purposes to provide a data processor capable of solving the problem as described above.

A data processor in accordance with the present invention is constituted in a manner capable of performing a correct operation of bit string data while avoiding a breakage of the data even in the case where a read-out area of the bit string and a write-in area thereof are overlapped each other by giving an option of designating the direction of bit processing to an operation code of an instruction.

In the data processor in accordance with the present invention, such a configuration allows quick acceptance of an external interrupt by enabling a break and re-start of execution processing of an instruction of operating a bit string. Also, the progress status of operation of the bit string by the instruction is represented by update of an operand in a register designating the bit string to be operated, thereby re-start of execution of the instruction is processed likewise start of the same.

Furthermore, the capacity of a bus can be utilized to a maximum extent by executing the processing of bit string in matching with the alignment of the bus.

The above and further objects and features of the invention will more fully be apparent from the following detailed description with accompanying drawings.

BRIEF DESCRIPTION OF THE DRAWINGS

FIG. 3 is a schematic diagram showing an operation code of a BVMAP instruction, FIG. 4 is a schematic diagram showing an operand of the BVMAP instruction, FIG. 6 through FIG. 11 are flowcharts showing execution sequences in executing the BVMAP instruction by control of a microprogram stored in a micro ROM, and among them, FIG. 6 through FIG. 8 are flowcharts in the case of proceeding processing of a bit field in the direction of increasing side in the bit number, FIG. 9 through FIG. 11 are flowcharts in the case of proceeding processing of the bit field in the direction of decreasing side in the bit number.

DESCRIPTION OF THE PREFERRED EMBODIMENTS

Hereinafter, description will be given an embodiment in accordance with the present invention in reference to the drawings.

Figure 1:
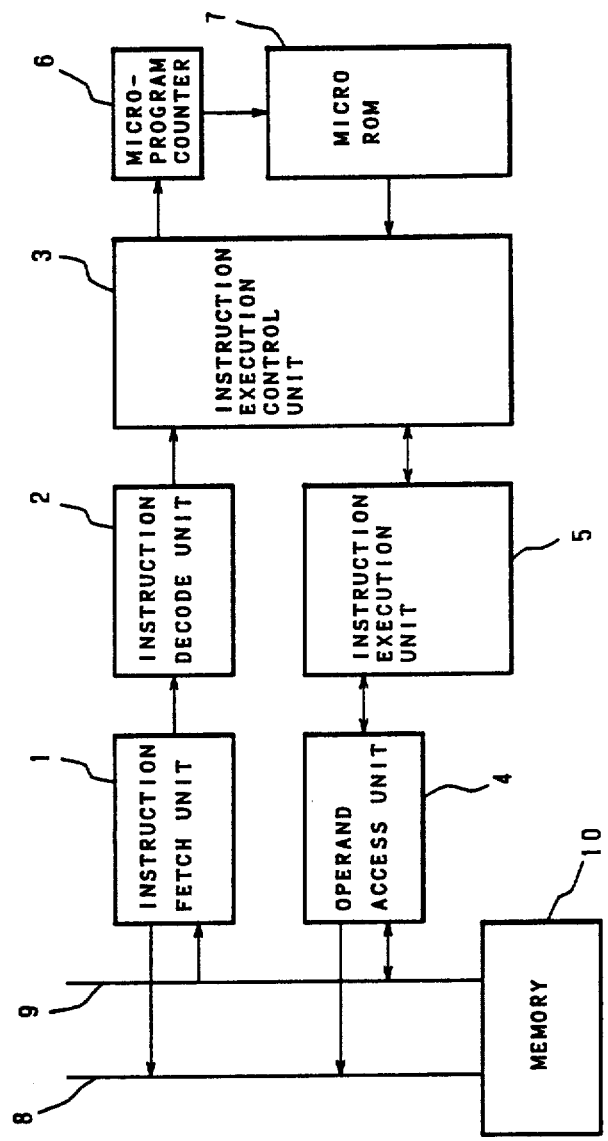
FIG. 1 is a block diagram showing one example of the whole configuration of a data processor in accordance with the present invention.

FIG. 1 is a view showing the whole configuration of a data processor in accordance with the present invention.

In FIG. 1, numeral 1 designates an instruction fetch unit which sends addresses to a memory 10 through an address bus 8, and fetches instructions from the memory 10 through a data bus 9.

Numeral 2 designates an instruction decode unit which receives instructions from the instruction fetch unit 1, decodes it, and outputs information required for executing that instruction.

Numeral 3 designates an instruction execution control unit which outputs microprogram entry address stored in a micro ROM 7 and showing the head address of a microprogram executing the instruction to a counter 6 based on the microprogram entry address or information such as general purpose register number, operands and data sizes outputted from the instruction decode unit 2, and controls an instruction execution unit 5 by micro instructions outputted form the micro ROM 7 by addresses designated one after another by the microprogram counter 6 and by other information outputted from the instruction decode unit 2 and thereby executing an instruction.

Numeral 4 designates an operand access unit which, in the case where an operand required in executing an instruction exists in a memory 10, outputs the address thereof to the address bus 8 and fetches the operand through the data bus 9, or in the case where an operand is required to be stored in the memory 10, outputs the address thereof to the address bus 8, and outputs the operand to the data bus 9.

Figure 2:
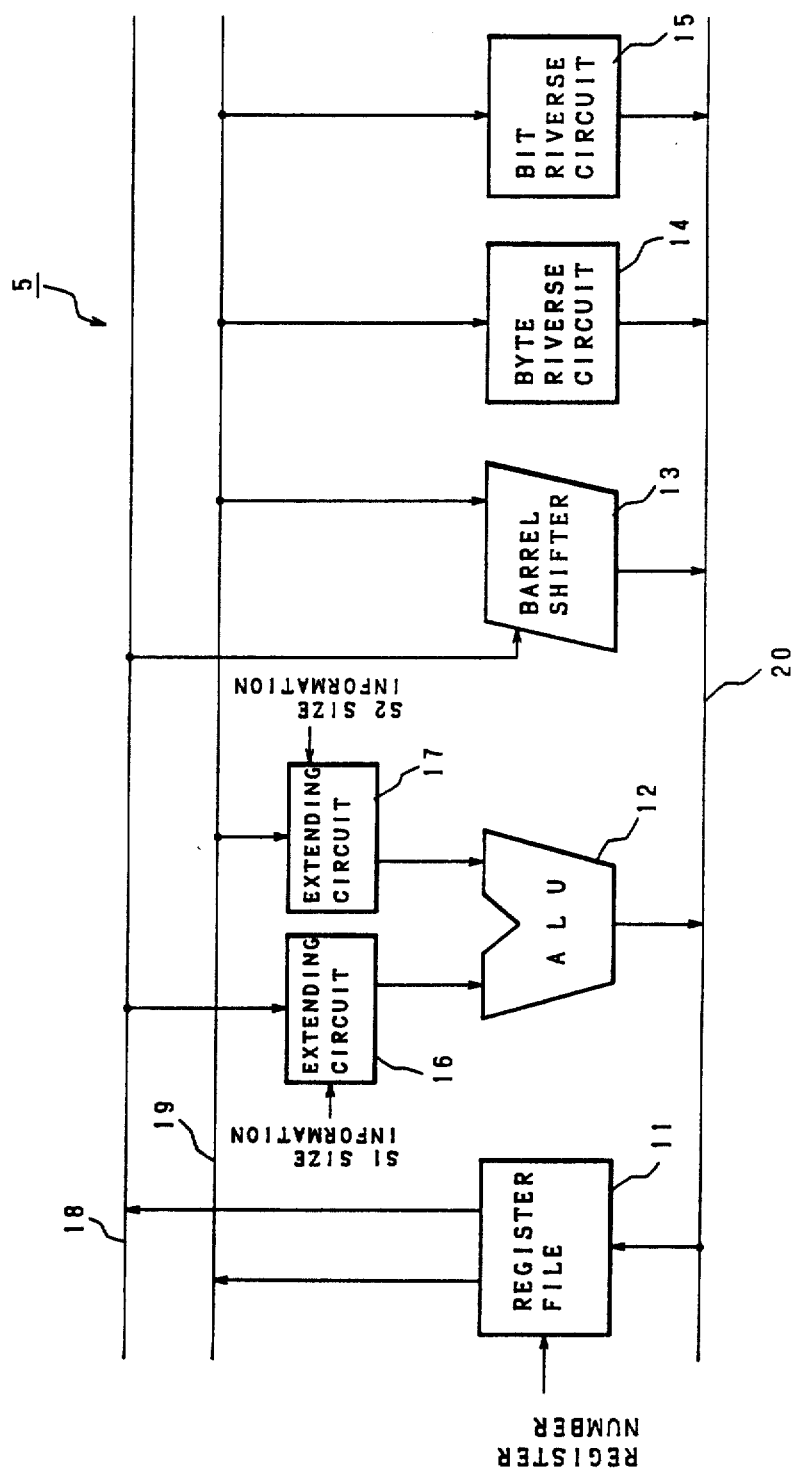
FIG. 2 is a block diagram showing a detailed configuration of an instruction execution unit.

FIG. 2 is a block diagram showing the detail of the instruction execution unit 5 in FIG. 1.

Numeral 11 designates a register file storing data as an operand.

Numerals 12, 13, 14 and 15 designate arithmetic units, respectively. In addition, numeral 12 designates an ALU executing arithmetic operation such as addition of two binary numbers and logical operation such as logical AND of two bit fields.

Numerals 16 and 17 designate extension circuits which, in inputting data having a data size smaller than that of the ALU 12, perform zero extension or signed extension of the size thereof to a data size handled by the ALU 12.

Numeral 13 designates a barrel shifter for shifting data right or left or a plurality of bit at one operation.

Numeral 14 designates a byte reverse circuit for reversing the byte order of a byte string, and numeral 15 designates a bit reverse circuit for reversing the bit order of a bit string.

Numerals 18, 19 and 20 designate buses for linking the register file 11 with the arithmetic units 12, 13, 14 and 15.

The register file 11 is linked in a 32-bit parallel fashion with the arithmetic units 12, 13, 14 and 15 such as the ALU 12. In addition, the bit store position of the register 11 and the input output bit position of the ALU 12 are in a corresponding to one-to-one.

Hereinafter, description will be given on operation of such an apparatus of the present invention.

In addition, description on the detail of instructions that the data processor of the present invention as described above executes under control of microprograms stored in the micro ROM 7 is made in the Japanese Patent Application No. 62-247418 (1987), titled "Data Processor", applied by one of the present inventors.

Hereinafter, description will be given on specifically on operation of an instruction called BVMAP instruction, which operates a bit field having an arbitrary bit length.

FIG. 3 is a schematic diagram representing an operation code of the BVMAP instruction.

In this diagram, b bit 21 designates processing of a bit field to proceed in the direct increasing the bit number where b=0, and designates processing of the bit field to proceed in the direction of decreasing the bit number where b=1.

FIG. 4 is a schematic diagram showing an operand of the BVMAP instruction.

The operand of the BVMAP instruction is stored in an RO register 22, an R1 register 23, an R2 register 24, an R3 register 25, an R4 register 26 and an R5 register 27 which are for general purpose and are provided in the register file 11.

An address as a base of a bit field of the source side (hereinafter referred to as source address) is put in the RO register 22, a bit offset of the bit field of the source side (hereinafter referred to as source offset) is put in the R1 register 23, a value showing the length of a bit field to be processed (hereinafter referred to as the number of bit) is put in the R2 register 24, an address as a base of a bit field of the destination side (hereinafter referred to as destination address) is put in the R3 register 25, and a bit offset of the bit field of the destination side (hereinafter referred to as destination offset) is put in the R4 register 26, respectively.

Then, the kind of logical operation between the bit field of the source side and that of the destination side is designated by the R5 register 27.

Figure 5:
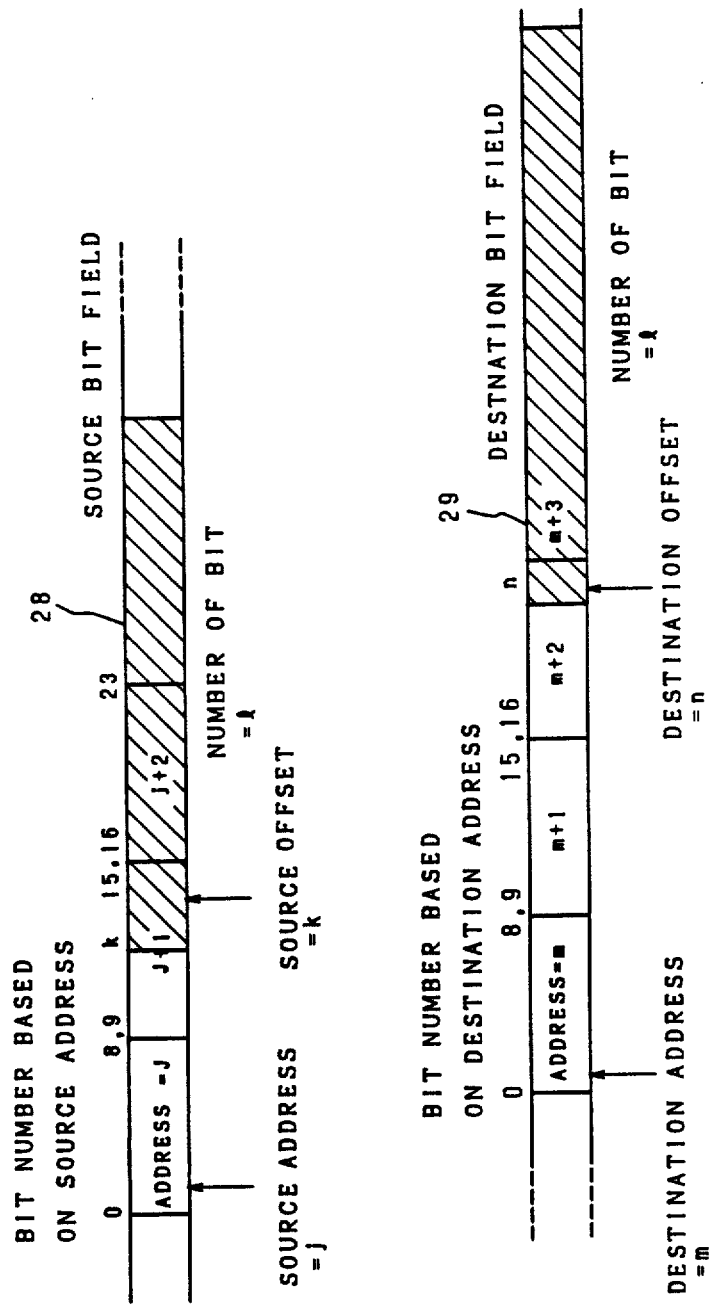
FIG. 5 is an explanatory view of a bit field.

FIG. 5 is a schematic diagram explaining a configuration of a bit field.

A source bit field 28 is designated by a source address (=j), a source offset (=k) indicating the number of bits apart from the most significant bit of the source address to the most significant bit of the source bit field 28, and the number of bits (=l) indicating the number of bits of the source bit field 28 (common with the number of bits of the destination bit field).

Likewise, a destination bit field 29 is designating also by the destination address, the destination offset and the number of bits.

FIG. 6 through FIG. 11 are flowcharts showing executing sequences in the case of executing the BVMAP instruction under control of a microprogram stored in the micro ROM 7.

Figure 6:
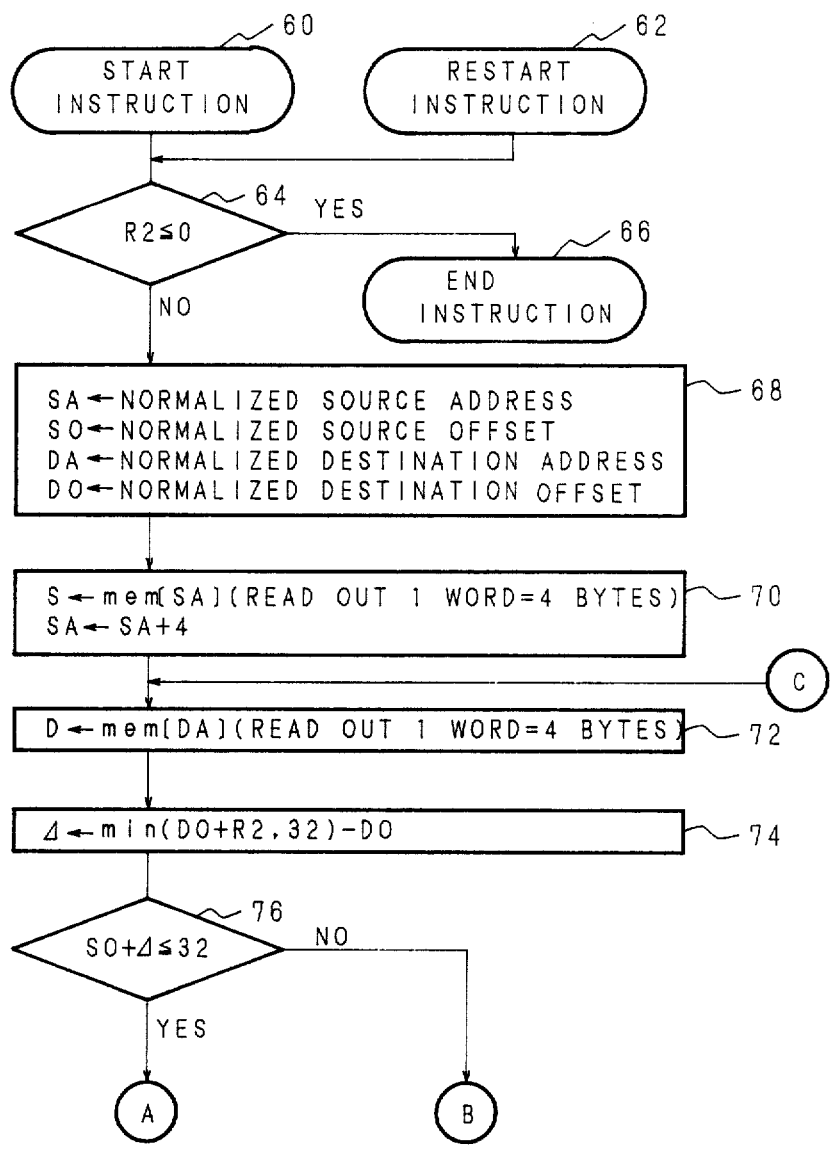
Figure 7:
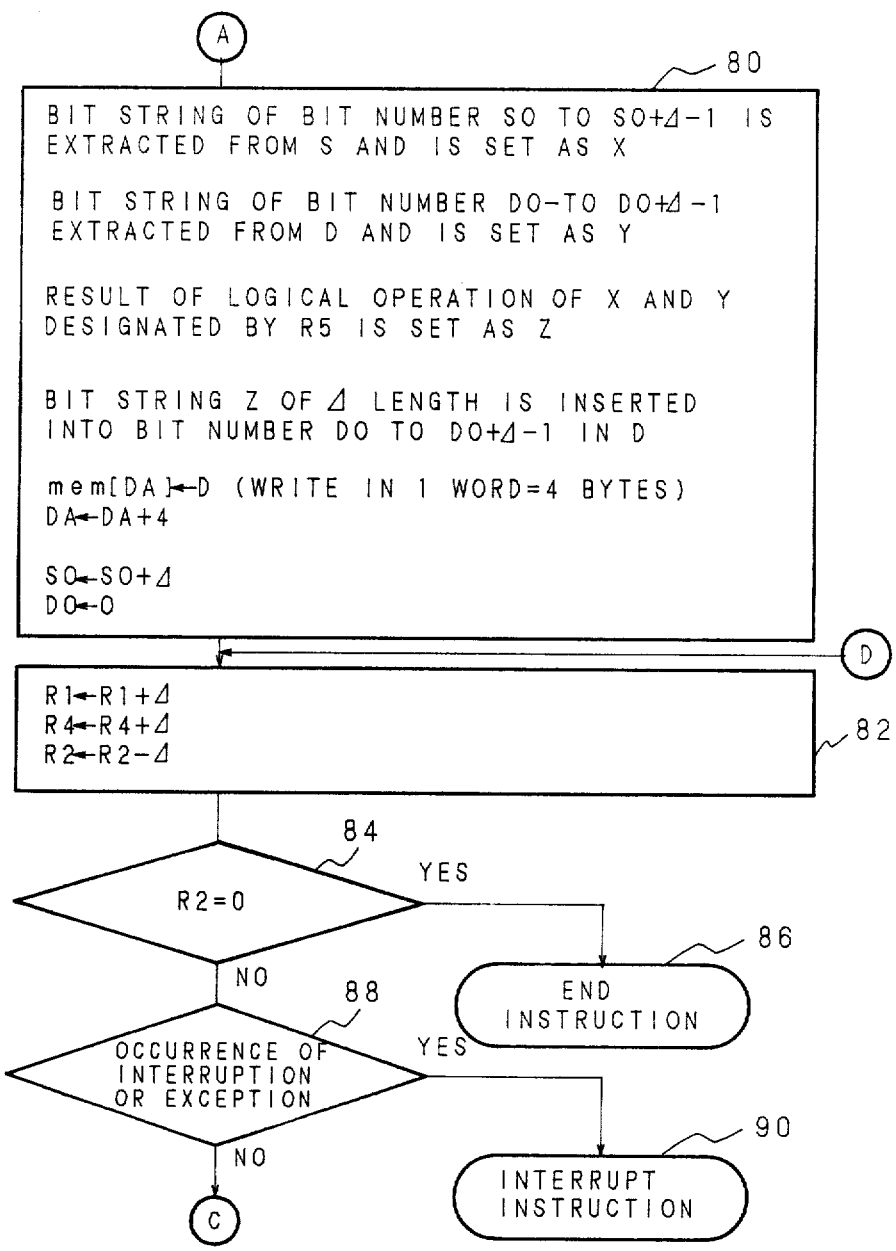
Figure 9:
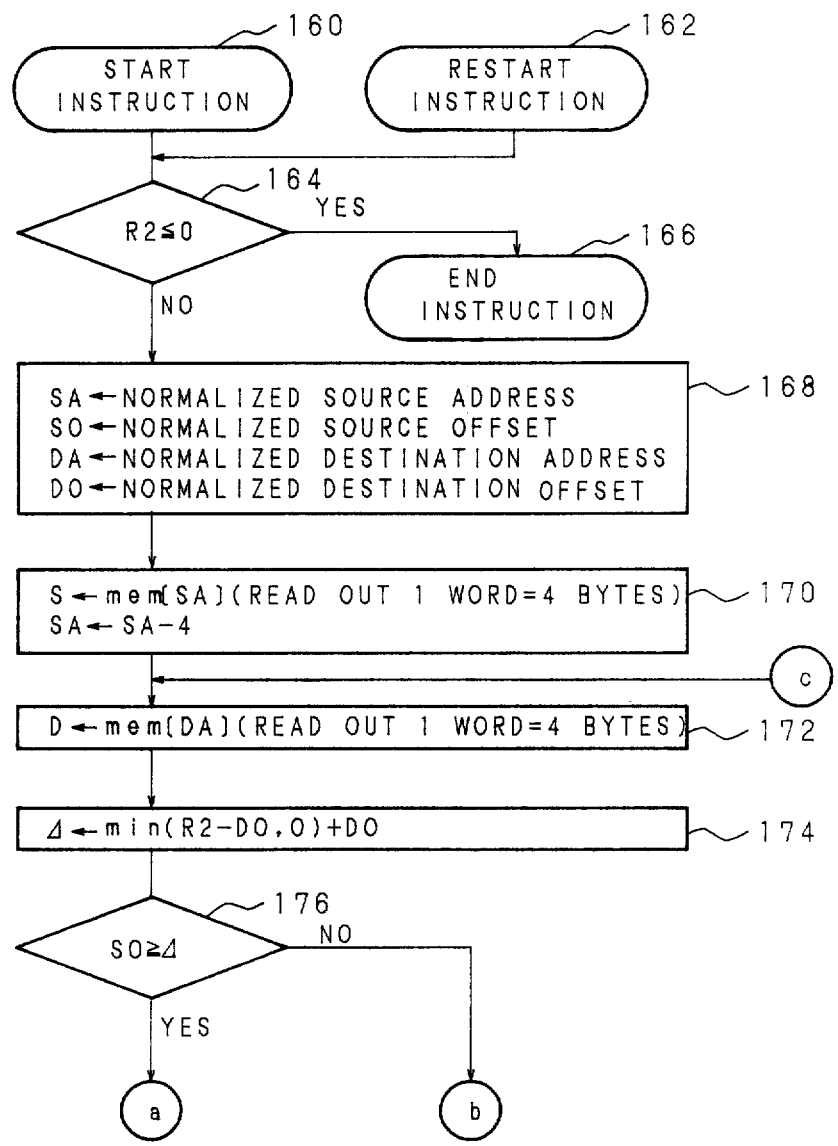
Figure 10:
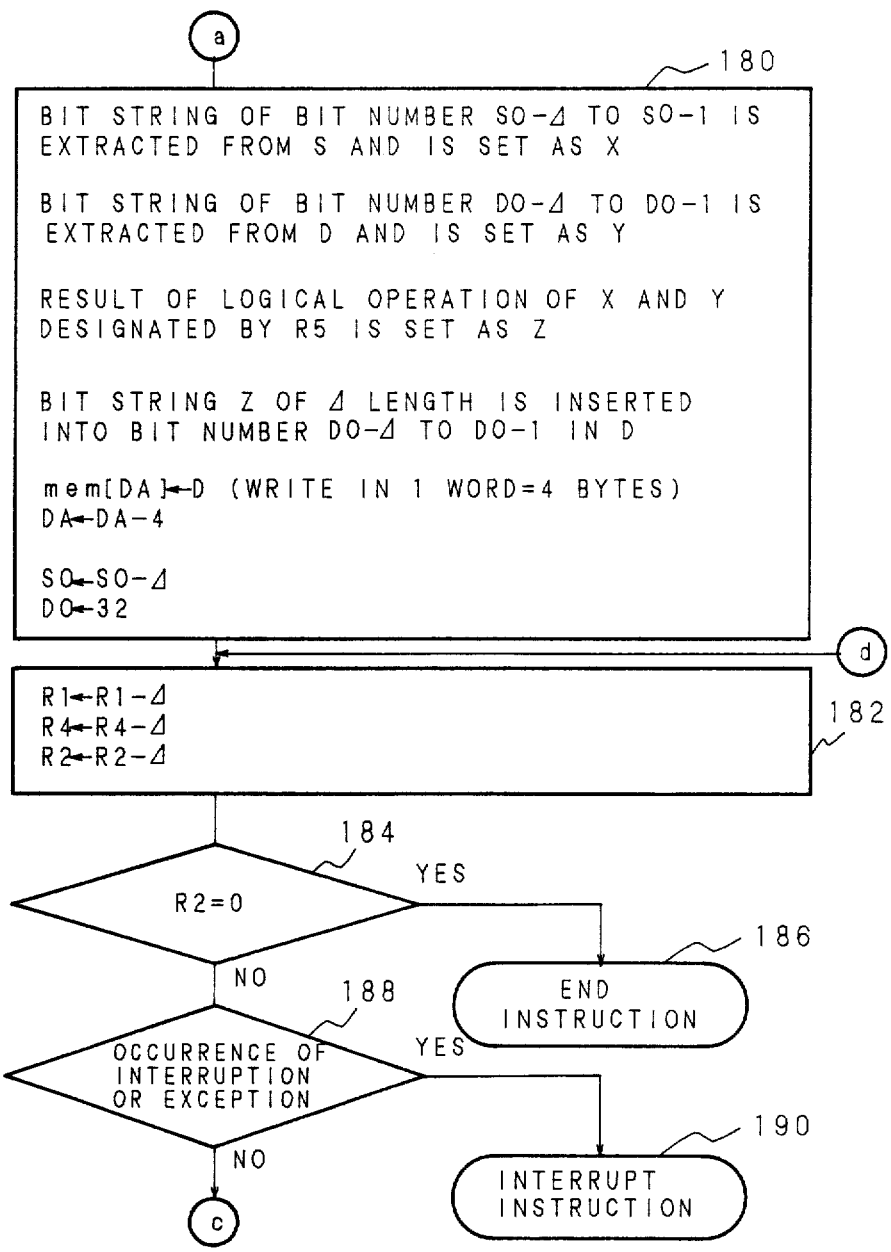

Among them, FIG. 6 through FIG. 8 are flowcharts in the case where processing of a bit field proceeds in the direction of increasing the bit number, and FIG. 9 through FIG. 11 are flowcharts in the case where processing of the bit field proceeds in the direction of decreasing the bit number.

Figure 12:
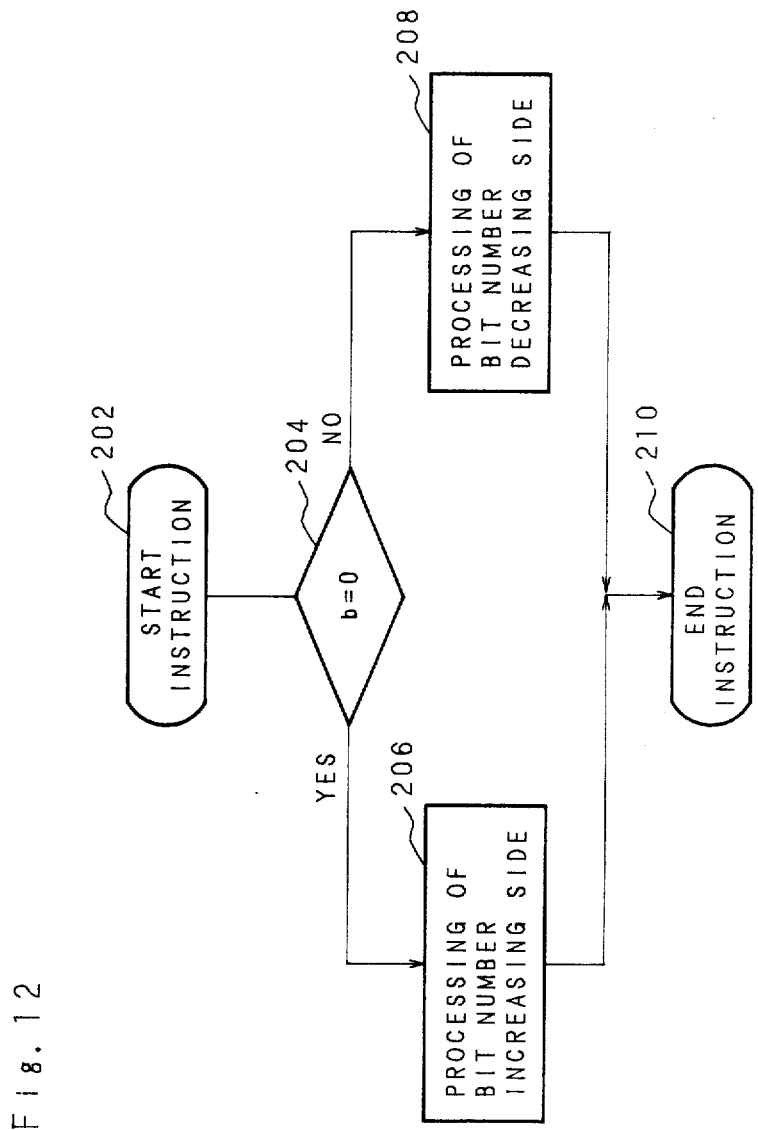
FIG. 12 is a flowchart showing another example of executing sequence of the BVMAP instruction.

FIG. 12 is a flowchart showing an execution sequence of the BVMAP instruction in another embodiment of the data processor in accordance with the present invention.

An operation code of the BVMAP instruction is fetched to the instruction fetch unit 1, thereafter being decoded in the instruction decode unit 1. At this time, the instruction decode unit 1 directs the instruction execution control unit 3 directs to select an microprogram entry which advances processing the bit field in the direction of increasing the bit number when the b bit 21 in the operation code is '0', and directs to select an microprogram entry which advances processing of the bit field in the direction of decreasing the bit number when the b bit 21 is '1'. When the microinstruction of the selected microprogram entry is outputted from the micro ROM 7, the instruction execution control unit 3 controls the instruction execution unit 5, and executes the BVMAP instruction.

First, description will be given on the execution sequence of the micro instruction in the case where processing of the bit field proceeds in the direction of increasing the bit number.

When an instruction is started 60, first, checking is made for whether or not the number of bits held in the R2 register 24 is negative 64. As a result, if the number is negative, it is unsuitable as an operand, and therefore the instruction is made to end at this point 66. On the other hand, if it is not negative, the next processing is executed, and the source address, source offset, destination address and destination offset are normalized, being made into SA, SO, DA and DO, respectively 68.

In addition, normalization in this case is to obtain an address of an aligned word including the most significant bit of the bit field and an offset value corresponding to that address. Specifically, the normalization of an address is realized in a manner that a quotient of offset divided by 8 is added to the address, and thereafter two low-order bits are converted into '0'. Also, the normalization of an off-set is realized by obtaining a residue when the offset is divided by 32.

When the normalization is completed in such a manner, first, data of the first one word (=4 byte) of the source side is read-out 70. According to the value of SA, one word data is read-out from the memory 10 through the operand access unit 4, and this is set as S, being stored in one of the general purpose registers provided in the register file 11. Then, the value of SA is added by '4' to make into an address of data following the data now read 70.

Subsequently, the first one word (=4 bytes) data of the destination side is read-out 72. One word data of the value of DA is read-out from the memory 10 through the operand access unit 4, and this is stored as D in one of the general purpose registers provided in the register file 11.

Subsequently, the number of bits of the bit field contained in D is calculated 74. This can be evaluated in a manner that 'DO+R2' is compared with 32, and the smaller value is substracted by DO. The evaluated value is stored as Δ in one of the general purpose registers in the register file 11.

Here, checking is made for whether or not the length of the bit field contained in S is smaller than Δ76. When it is smaller, data following S must be read-out from the memory 10 to execute logical operation with the bit field in D. However, when the length of the bit field in S is larger than Δ, read-out from the memory 10 is not required, and therefore these processings must be executed separately. Then, SO is added by Δ, and if the result is 32 or less, it indicates that the length of the bit field contained in S is Δ or more, and processing proceeds to (A). On the other hand, in the case of SO+Δ>32, it shows that the length of the bit field in S is smaller than Δ, and processing branches to (B).

In the case (see FIG. 7) where processing proceeds to (A), logical operation designated by the R5 register 27 is executed for the read-out data of the source side and the data of the destination side, and the results thereof is rewritten to the location where D has been stored in the memory 10 80.

A bit string of bit numbers 'SO' to 'SO+Δ−1' in S is extracted and is set as X, and a bit string of bit numbers 'DO' to 'DO+Δ−1' in D is extracted and is set as Y, and they are stored in one of the general purpose registers in the register file 11, respectively. Logical operation designated by the R5 register 27 is executed for X and Y, and a bit string having a length Δ obtained as the result thereof is inserted into the bit numbers 'DO' to 'DO+Δ−1' in D, and the value of D is re-written to the location where D has been stored in the memory 10. Thereafter, the value of DA is added by '4' to indicated the address of data following D.

Also, the value of SO is added by the amount (=Δ) now processed to be set as source offset for a bit field not yet processed. Also, bit fields not yet processed of the destination side begin with the initial (bit number '0') of data following D, and therefore the value of DO is held set to 0.

On the other hand (see FIG. 8), when processing branches to (B), first, one word data following S is read-out 90. Since the value of SA indicates an address of data following S in the preceding processing, one word is read-out from the memory 10 using the value of SA, and this is stored as T in one of the general purpose registers in the register file 11. After reading-out it, the value of SA is added by 4 to indicate an address of data following T.

A bit string of bit numbers 'SO' to 'SO+Δ−1' is extracted from two word data obtained by coupling S and T, and is set as X, and a bit string of bit numbers 'DO' to 'DO+Δ−1' is extracted from D, and is set as Y, and they are stored in one of the general purpose registers in the register file 11.

Thereafter, logical operation is executed between X and Y likewise the processing (A), and the result thereof is rewritten to the location where D has been stored in the memory 10. Then, the value of DA is added by 4. If bit fields not yet processed still remain in T, they are used for the next processing, and therefore the value of T is transferred to S. Also, the value of SO is made into a source offset for the bit field not yet processed by adding 'Δ−32' thereto. The value of DO is set to '0', and processing returns to (D).

Here, to set offset values and the numbers of bits put in the R1 register 23, the R4 register 26 and the R2 register 24 as information for the bit fields not yet processed, the offset value has to be increased by the amount of processing, and the number of bits has to be decreased by the amount of processing. Accordingly, the R1 register 23 and the R4 register 26 are added by Δ, and the R2 register 24 is subtracted by Δ82.

At this time, when the value of the R2 register 24 becomes '0'84, it means that bit fields not yet processed are not left, and the instruction is made to end 86. If not '0'84, bit fields not yet processed are left, and therefore processing is continued 88.

Here, even if the instruction is interrupted, since the values of the R1 register 23, the R4 register 26 and the R2 register 24 has been updated, processing of bit fields not yet processed can be executed even if the execution of instruction is re-started after interruption. Accordingly, by providing a means for accepting an interrupt 88, exception or the like at this point, if an interrupt or exception is generated, processing corresponding thereto can be executed with the instruction interrupted. When the instruction is re-executed after completion of processing of interrupt or exception, the processing before the interruption of the instruction is executed successively. If no interrupt or exception is generated, processing returns to (C) and the sequence as described before is executed again, and this loop is repeated until the bit fields to be processed run out.

Next, description will be given on execute sequences of microinstructions in the case where processing of the bit field proceeds in the direction of decreasing the bit number in reference to FIG. 9 through FIG. 11.

Since the basic sequence is the same as the case where processing proceeds in the direction of increasing, simple description is made on others than different points.

When an instruction is started, checking is made for whether or not the number of bits held in the R2 register 24 is negative 164, and thereafter addresses and offsets of the source and the destination are normalized, respectively 168.

The first one word (=4 bytes) data of the source side is read-out from the memory 10, and this is set as S. Then, this case, the value of SA is subtracted by '4' for processing in the direction of decreasing 170.

Subsequently, the first one word (=4 bytes) data of the destination side is read-out from the memory 10, being set as D 172.

Calculation of Δ is executed in a manner that 'R2−DO' and '0' are compared with each other and the one whichever smaller is added by 'DO'174.

Hence, checking is made for whether or not the length of the bit field contained in S is smaller than Δ176. If the result of the comparison of SO with Δis 'SO≧Δ', it indicates that the length of the bit field in S is Δ or more, and processing proceeds to (a). On the other hand, if the result thereof is 'SO>Δ', it shows that the length of the bit field in S is smaller than Δ, and processing branches to (b).

When processing proceeds to (a), logical operation designated by the R5 register 27 is executed between the bit string X extracted from S and the bit string Y extracted from D, and the result thereof is written-in again to the location where D has been stored in the memory 10 180. At this time, the bit number of X in S becomes 'SO−Δ' to 'SO−1', the bit number of Y in D becomes 'DO−Δ' to 'DO−1' and the result of operation is inserted into the bit numbers 'DO−Δ' to 'DO−1' in D. Thereafter, the value of DA is subtracted by 4.

Also, the value of SO is taken as SO−Δ, being set as a source offset for the bit field not yet processed. Also, the bit field not yet processed of the destination side begins with the least significant bit (bit number '31') of data following D, and therefore the value of DO is set to 32.

On the other hand, when processing branches to (b), one word data following S is read, and this is set as T, and thereafter the value of SA is subtracted by 4 this time 200.

A bit string of the bit numbers '32+SO−Δ' to '32+SO−1' is extracted from two word data obtained by coupling S and T, and is set as X, and a bit string of the bit numbers 'DO− Δ' to 'DO−1' is extracted from D, and is set as Y, and they Y, and they are stored in one of the general purpose registers in the register file 11, respectively. Thereafter, logical operation is executed between X and Y, and the result thereof is re-written to the location where D has been stored in the memory 10. Then, the value of DA is subtracted by 4. Also, the value of T is transferred to S, and thereafter the value of SO is set to '32 +SO−Δ', and the value of DO is to 32, and processing returns to (d).

For update of the R1 register 23, the R4 register 26 and the R2 register 24, processing is executed in the direction of decreasing the bit number, therefore the value of offset is decreased by the amount of processing 182. Accordingly, the R1 register 23 and the R4 register 26 are subtracted by Δ. The R2 register 24 showing the length of bit field is subtracted by Δ likewise the processing in the direction of increase.

At this time, if the value of R2 register 24 becomes 0, the instruction ends, and if not 0, processing is continued 184.

Then, at this point, an interrupt or exception is accepted 188, and if an interrupt or exception is generated, the instruction is interrupted 190 and the corresponding processing is performed. After completing the processing, when reexecution of the instruction is performed, the processing before the interruption is executed successively. If no interrupt or exception is generated, processing returns to (c), and this loop is repeated until the bit fields to be processed run out.

The BVMAP instruction can be executed by the method as described above. Here, in decoding an operation code of the BVMAP instruction in the instruction decode unit 2, whether the processing is executed in the direction of increasing the bit number or in the direction of decrease is discriminated by the value of the b bit 21, and an entry of the microprogram corresponding to each case is designated. However, as another embodiment, as shown in FIG. 12, the BVMAP instruction can be executed by a method wherein, two kinds of processing methods are not discriminated in the instruction decode unit 2, and information of the b bit 21 is sent to the instruction execution control unit 3, and the microinstruction branches 204 to the processing in the direction of increase in the bit number 206 or to the processing in the direction of decrease 208 according to information of that b bit 21.

As described above, in the data processor in accordance with the present invention, by providing the operation code designating the direction of bit processing, a correct operation of a bit string data can be performed even in the case where the read-out area of bit strings and the write-in area thereof overlap each other.

Furthermore, by representing the status of progress of operation of a bit string by an instruction by update of an operand in the register designating the bit string to be operated, interruption and re-start of execute processing of the instruction operating the bit string becomes possible, and unnecessary delaying of acceptance of an external interrupt can be dispensed with, and at the same time, execute restart of the instruction can be processed likewise the case of execute start of the instruction.

Furthermore, by performing processing of the bit string in matching with alignment of a bus, the capacity of the bus can be utilized to a maximum extent, and thereby the efficiency of execution of the instruction can be enhanced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processing system that executes a bit processing instruction which specifies arbitrary starting and ending bit positions of a bit string in memory and the processing to be executed on the bit string comprising:

a data bus of a predetermined width coupled to a memory for transferring aligned words of said predetermined width to and from said memory;

means, coupled to said data bus, for accessing, only once, every aligned word comprising bits included in the bit string to be processed when the length of the bit string is greater than the predetermined width;

means for executing the processing specified by the instruction on only the bits in said accessed words that are included in said bit string.

2. A data processing system that executes a bit processing instruction which specifies an arbitrary source boundary bit address and source bit string length indicating the boundary bit positions of an aligned or unaligned read-out area in memory where a source bit string is stored, an arbitrary destination boundary bit address and destination bit string length indicating boundary bit positions of an aligned or unaligned write-in area in memory where a destination bit string is stored, and specifying the processing to be executed on the bit strings comprising:

a data bus of a predetermined width coupled to a memory for transferring aligned words of said predetermined width to and from said memory;

means for normalizing the source boundary bit address to generate a normalized source address of an aligned boundary source word that includes a source boundary bit position of the source bit string and to generate a normalized source offset that identifies the position of the source boundary bit in the aligned source boundary word, for normalizing the destination boundary bit address to generate a normalized destination address of an aligned boundary destination word that includes a destination boundary bit position of the destination bit string and to generate a normalized destination offset that identifies the position of the destination boundary bit in the aligned boundary destination word;

means for sequentially accessing all aligned source words that include bits in said read-out area only once when said read-out area is larger than said predetermined width, and with said accessing starting at said normalized source address;

means for sequentially accessing all aligned destination words that include bits in said write-in area only once when said write-in area is larger than said predetermined width, with said accessing starting at said normalized destination address;

means for extracting bits in said accessed aligned source words included in the source bit string and bits from said accessed aligned destination words included in the destination bit string, for executing a logic operation, specified by the instruction, on said extracted bits to form a processed bit string, and for inserting the bits of said processed bit string into said accessed aligned destination words to replace the extracted bits and form aligned modified words; and means for sequentially writing said aligned modified words to said memory, starting at said normalized boundary destination address, to replace the destination bit string in said write-in area with said processed bit string.

3. A data processing system that executes a bit processing instruction which specifies an arbitrary source boundary bit address and source bit string length indicating the boundary bit positions of an aligned or unaligned read-out area in memory where a source bit string is stored, an arbitrary destination boundary bit address and destination bit string length indicating boundary bit positions of an aligned or unaligned write-in area in memory where a destination bit string is stored, and specifying the processing to be executed on the bit strings comprising:

a data bus of a predetermined width coupled to a memory for transferring aligned words of said predetermined width to and from said memory;

means for normalizing the source boundary bit address to generate a normalized source address of an aligned boundary source word that includes a source boundary bit position of the source bit string and to generate a normalized source offset that identifies the position of the source boundary bit in the aligned source boundary word, for normalizing the destination boundary bit address to generate a normalized destination address of an aligned boundary destination word that includes a destination boundary bit position of the destination bit string and to generate a normalized destination offset that identifies the position of the destination boundary bit in the aligned boundary destination word;

means for sequentially accessing all aligned source words that include bits in said read-out area only once when said read-out area is larger than said predetermined width, and with said accessing starting at said normalized source address;

means for extracting bits in said accessed aligned source words included in the source bit string to form aligned modified words; and means for sequentially writing said aligned modified words to said memory, starting at said normalized boundary destination address, to replace the destination bit string in said write-in area with the source bit string.

* * * * *